UNITED STATES PATENT OFFICE.

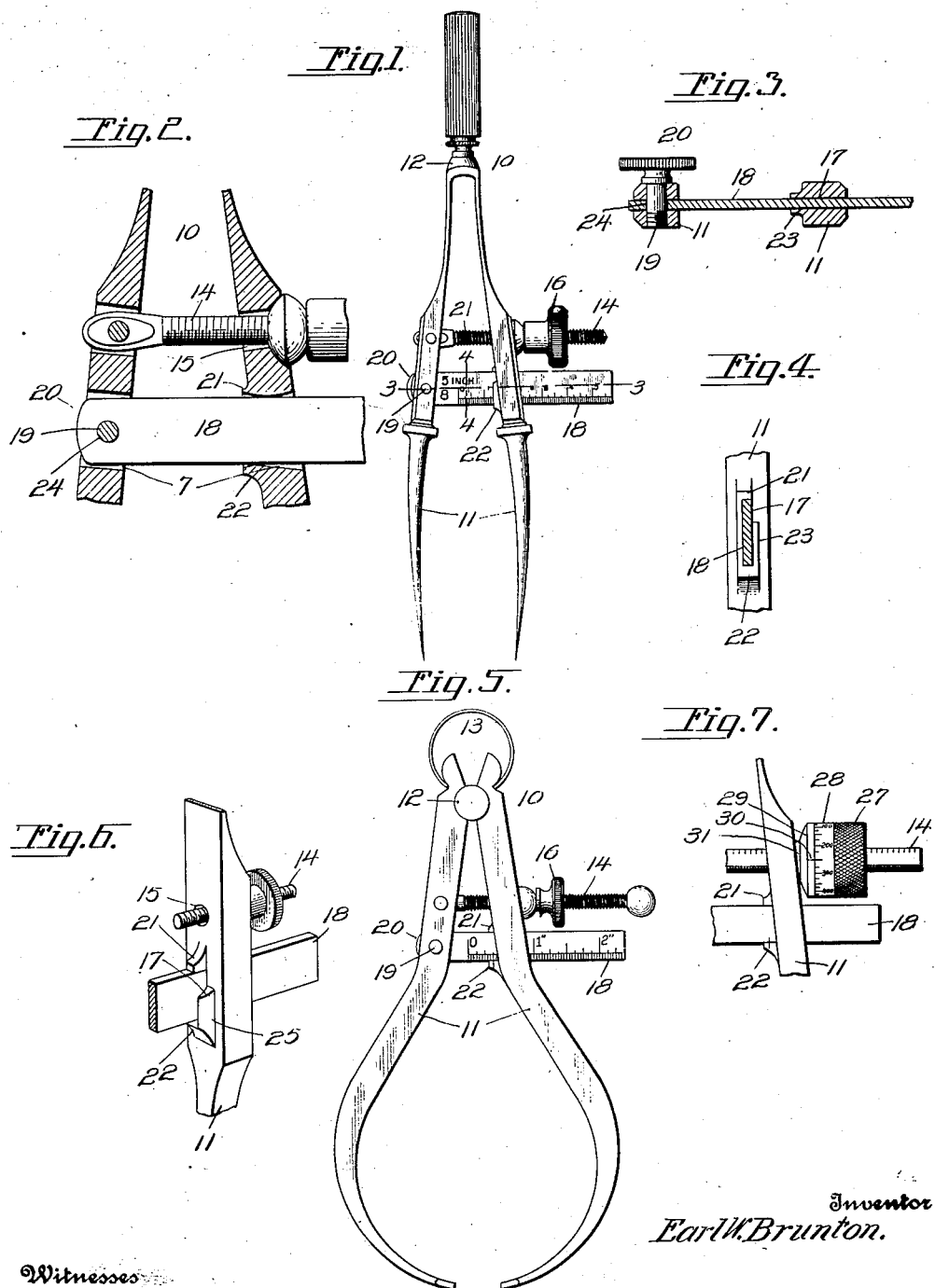

EARL W. BRUNTON, OF ST. LOUIS, MISSOURI.

MEASURING INSTRUMENT.

1,172,340.   Specification of Letters Patent.   Patented Feb. 22, 1916.

Application filed March 5, 1915. Serial No. 12,328.

*To all whom it may concern:*

Be it known that I, EARL W. BRUNTON, a citizen of the United States, residing at St. Louis, in the State of Missouri, have invented new and useful Improvements in Measuring Instruments, of which the following is a specification.

An object of the invention is to provide a measuring instrument particularly adaptable for use in making drawings to scale and in securing accurate measurements of objects.

The invention contemplates, among other features, the provision of a measuring instrument which may be in the nature of a pair of calipers or dividers and which, by the use of a scale member or bar, permits of obtaining accurate measurements of objects and the accurate construction of drawings.

In the further disclosure of the invention reference is to be had to the accompanying drawings, constituting a part of this specification, in which similar characters of reference denote corresponding parts in all the views, and in which:

Figure 1 is an elevation of a pair of dividers illustrating my invention in use; Fig. 2 is a fragmentary enlarged vertical sectional view taken through the structure shown in Fig. 1, showing the mounting of the scale member; Fig. 3 is a horizontal sectional view taken on the line 3—3 in Fig. 1; Fig. 4 is a vertical transverse sectional view taken on the line 4—4 in Fig. 1; Fig. 5 is an elevation of a pair of calipers showing the use of my invention with such form of measuring device; Fig. 6 is a fragmentary perspective view of one of the legs of a pair of dividers showing a modified form of my invention; and Fig. 7 is a fragmentary elevation showing a slightly modified form of adjusting mechanism.

Referring more particularly to the views, I disclose a measuring instrument 10 which may be in the form of a pair of dividers, as shown in Fig. 1 or a pair of calipers as shown in Fig. 5, the measuring instrument consisting, more particularly, of a pair of similar legs 11 terminating at their upper ends in a head 12, the legs 11 when constructed to form the dividers being of a material and formation whereby the legs will be of a spring-like nature and tend to move apart with respect to the head 12 and to which the legs are common, whereas when the measuring instrument is formed to provide the calipers shown a spring 13 is preferably employed to normally hold the legs apart, said legs swinging upon the head 12.

A screw 14 has its inner end suitably connected with one of the legs, said screw passing through an opening 15 in the other leg, with a nut 16 threaded upon the screw to bear against the last mentioned leg so that by adjusting the nut upon the screw the distance between the free ends of the legs can be varied, this being the usual construction or formation of calipers or dividers. Each leg 11 is provided with a slot 17 and the inner end of a thin paper-like scale member 18 passing through the slot of one of the legs is pivoted in said slot by a screw 19 passing transversely through the slot and having a suitable knurled head 20, the free end of the scale member passing through the slot in the other leg and arranged to slide therein, with the latter mentioned leg formed to provide an upper ledge 21 and a lower ledge 22, the slot of the latter leg having its upper and lower walls preferably inclined toward the ledges and which, forming continuations of the walls, provide edges 23 upon which the longitudinal edges of the scale member are arranged to slide so that any wabbling of the scale member will be prevented, whereas a side movement or looseness of the scale member in the slot of the latter mentioned leg will also be prevented due to the fact that the slot is made just sufficiently wide to accommodate the scale member and permit of its sliding therein.

The screw 19 passes loosely through an opening 24 in the scale member so that the scale member is free to swing and thus it will be apparent that when, through the medium of the screw and nut 14 and 16, the legs 11 of the measuring instrument are moved together or apart, the scale member, sliding through the slot in one of the legs and pivoted in the slot of the other leg will readily show the distance between the free ends of the legs, said scale member being constructed and graduated to this end. Therefore, an accurate measurement can be obtained by simply operating the scale to determine the distance between the free ends or measuring ends of the legs without necessitating the application of the dividers or calipers to the usual rule in order to determine this distance, and it will be clearly seen that by providing the ledges 21 and 22 the sliding of the scale member without restriction will be insured when the legs are moved apart or together and by having the edges 23 formed on the ledges 21 and 22, with the scale member operating over said edges, the scale member will readily slide with very little friction, the lower ledge being preferably employed as a reading point, with its free edge taken in conjunction with the reading on the scale in alinement with the free edge, adapted to signify the distance between the free ends of the ledge.

The scale member is preferably interchangeable to the extent that it can be readily removed from the measuring instrument by removing the screw 19 so that another scale member can be used with the instrument if desired and the scale member is furthermore preferably provided with graduations on both sides, the graduations on one side denoting, for instance, five-eighths of an inch to the foot and the graduations on the other side denoting, for instance, three-quarters of an inch to the foot. If desired, the graduations on one side can read in sixteenths and the graduations on the other side in tenths, it being obvious, of course, that various particular forms or degrees of graduations can be employed in connection with the scale member in accordance with the kind of work that is to be accomplished with the measuring instrument.

In Fig. 6 I show a modified form of my measuring instrument, and in which there is merely added a vertical flange or projection 25 to the leg through the slot of which the scale member slides, said projection 25 being integral with the lower ledge and to one side thereof so as to have a beveled edge 26 thereof lie in registration with a particular graduation on the scale to indicate the reading of the scale.

It will also be understood that the scale member can be made in various shapes and sizes, this being dependent entirely upon the particular work for which the scale member is adapted to be used and the particular kind of calipers or dividers or other measuring instrument with which the scale member is to be used.

In Fig. 7 I show a slightly modified form of my invention in that the nut is constructed slightly different to permit of accurate measurements to a thousandth of an inch. To this end, the screw 14 preferably has its threads made very small as to the extent of fifty to the inch, with a nut 27 threaded on to the screw so that one revolution of the nut upon the screw will result in a movement equal to a fiftieth part of an inch, a micrometric scale 28 being formed on the nut and preferably divided into equal parts such as hundredths part of an inch, with a follower 29 arranged to slide upon the screw and held against rotation, said follower having an indication 30 with which is adapted to coöperate the scale 28 when the nut is turned in order to determine the advancement of the nut upon the screw when the nut is rotated. The follower 29 has a bead-like head 31 which bears against the leg of the instrument through which the scale slides and, as will be clearly seen, when the nut is turned up, it, bearing against the follower and the follower bearing against the mentioned leg, will tend to move the legs of the measuring instrument toward each other a distance equal to the indicated graduation of the scale 28 which registers with the indication 30 on the follower when the nut is turned, it being understood that the turning of the nut causes the legs to be moved together in that the graduations on the nut, in conjunction with the indication on the follower, indicate the degree of movement of the nut and thus the degree of distance that the legs have been moved apart or away from each other.

Having thus described my invention, I claim:

1. In combination with a measuring instrument, including relatively movable legs and means for relatively adjusting the same, a scale member pivoted in one of said legs and slidingly passing through the other leg, ledges on said other leg and across which the opposed longitudinal edges of the scale member are adapted to operate, one of said ledges serving as a reading projection to insure an accurate reading upon the scale member.

2. In combination with relatively movable measuring elements, and means for relatively adjusting the same, each of said elements having a slot, a scale member having an end pivoted in the slot of one of the elements and slidingly passing through the slot of the other element, and opposed ledges projecting from the inner face of the latter element and having the scale member operating across the same, the upper and lower walls of the slot inclining toward the ledges, to insure a proper sliding of the scale member in the slot of said latter element and preventing any accidental movements thereof.

3. In a measuring instrument including a pair of associated legs adapted to be moved toward or away from each other, a scale carried by one of the legs and coöperating with the other leg to denote the distance between the legs, and means for moving the legs toward or away from each other and for recording supplementary or micrometric degrees of distances that the legs are toward or away from each other and which distances are supplementary to degrees of graduation on said scale.

In testimony whereof I affix my signature in presence of two witnesses.

EARL W. BRUNTON.

Witnesses:
M. M. JESTES,
EDWARE SPENLINSON.